US012678970B1

(12) United States Patent
Ma et al.

(10) Patent No.: US 12,678,970 B1
(45) Date of Patent: Jul. 14, 2026

(54) ROBOTIC WIPER AND SYSTEM THEREOF

(71) Applicant: Jingjie Xunhang (Suzhou) Technology Co., Ltd., Suzhou (CN)

(72) Inventors: Li Ma, Suzhou (CN); Jiang Shi, Suzhou (CN)

(73) Assignee: Jingjie Xunhang (Suzhou) Technology Co., Ltd., Suzhou (CN)

( * ) Notice: Subject to any disclaimer, the term of this patent is extended or adjusted under 35 U.S.C. 154(b) by 0 days.

(21) Appl. No.: 19/385,445

(22) Filed: Nov. 11, 2025

(30) Foreign Application Priority Data

Apr. 16, 2025 (CN) .......................... 202520714855.4

(51) Int. Cl.
*B25J 9/00* (2006.01)
*B25J 11/00* (2006.01)
*B25J 13/08* (2006.01)

(52) U.S. Cl.
CPC ......... *B25J 11/0085* (2013.01); *B25J 9/0009* (2013.01); *B25J 13/08* (2013.01)

(58) Field of Classification Search
CPC ....... B25J 11/0085; B25J 9/0009; B25J 13/08
See application file for complete search history.

(56) References Cited

U.S. PATENT DOCUMENTS

2022/0079400 A1 * 3/2022 Wang ........................ B08B 1/34
2025/0031920 A1 * 1/2025 Chao ......................... A47L 1/02
2025/0031922 A1 * 1/2025 Chao ....................... B08B 1/143

FOREIGN PATENT DOCUMENTS

CN      205018960 U    2/2016
CN      117442096 A    1/2024
CN      117530618 A    2/2024

* cited by examiner

*Primary Examiner* — Ian Jen
(74) *Attorney, Agent, or Firm* — IPro, PLLC

(57) ABSTRACT

Disclosed is a robotic wiper, including: a body; a first cleaning assembly; a detection device, including a detection member, the detection member having a first working state and a second working state; and a second cleaning assembly, capable of moving relative to the body in the direction perpendicular to the to-be-wiped surface, where when the detection member is in the first working state, the second cleaning assembly is in one of the following three working states: a first state maintained at the first position, a second state maintained at the second position, and a third state transitioning between the first position and the second position; when the detection member is in the second working state, the second cleaning assembly is in one of the following two working states: the first state maintained at the first position, and the second state maintained at the second position.

20 Claims, 7 Drawing Sheets

100

102

101

10

50

ROBOTIC WIPER AND SYSTEM THEREOF

CROSS-REFERENCE TO RELATED APPLICATIONS

The present application claims priority to Chinese patent application No. 202520714855.4, filed with the China National Intellectual Property Administration on Apr. 16, 2025 and titled "ROBOTIC WIPER AND SYSTEM THEREOF", which is incorporated herein by reference in its entirety.

TECHNICAL FIELD

The present application relates to the technical field of intelligent cleaning and, in particular, to a robotic wiper and a system thereof.

BACKGROUND

A robotic wiper is a type of smart home appliance that can firmly adhere to a to-be-wiped surface through suction generated by evacuating a negative pressure chamber, and clean the to-be-wiped surface using a cleaning cloth at its bottom.

In the prior art, to prevent the robotic wiper from falling off the edge of a glass surface, the robotic wiper is typically provided with a retractable spherical head used to detect the glass edge. When the spherical head is suspended beyond the glass surface, it indicates that the robotic wiper has reached the glass edge, at which point the robotic wiper changes its traveling direction to avoid the risk of falling.

During the process of cleaning a to-be-wiped surface (e.g., glass), the robotic wiper often sweeps dust toward the edges of the glass, allowing it to accumulate at the glass edges or window corners. This results in inadequate cleaning of the glass edges and corners. On the other hand, since the glass corners and edges are more prone to dust accumulation compared to the center of a window, cleaning corners becomes even more challenging.

In the prior art, the spherical head of the robotic wiper typically extends outside its body housing, and to clean the glass edges and corners, a cleaning device is also arranged on the spherical head.

Although the cleaning device on the spherical head in the prior art, which extends outside the body housing of the robotic wiper, can clean the window edges, in this approach, when the spherical head first wipes the interior of the glass and then wipes the glass edges, or when it first wipes the glass edges and then wipes the interior of the glass, to avoid using the spherical head that has already wiped the glass to clean the glass again, the spherical head that has already wiped the glass must be cleaned or replaced. This process is complex and results in low working efficiency. Moreover, since the cleaning device is disposed on the spherical head and is used to clean the glass edges and corners, when the cleaning device accumulates dust, the dust may fall into the interior of the spherical head, easily affecting the retraction and extension performance of the spherical head and reducing the detection sensitivity of the spherical head.

On the other hand, due to the constraints of window frames, the robotic wiper can avoid falling off the glass surface when wiping the edges of framed glass, thus preventing the risk of falling. However, if the robotic wiper cleans the edges of frameless glass surfaces, it is prone to falling due to the lack of obstruction at the glass edges. This not only fails to achieve the goal of cleaning dirt at the glass edges but also increases the risk.

It should be noted that the information disclosed in the above background is only intended to enhance the understanding of the background of this disclosure, and therefore may include information that does not constitute the prior art known to a person of ordinary skill in the art.

SUMMARY

Some embodiments of the present application provides a base station for a robotic wiper and a robotic wiper system. Specifically, according to an aspect of the present application, there is provided:

a robotic wiper, including:

a body;

an adsorption unit, disposed on the body and configured to adsorb the robotic wiper onto a to-be-wiped surface;

a first cleaning assembly, disposed at a bottom of the body and configured to perform a cleaning task on the to-be-wiped surface;

a detection device, disposed at an edge of the body and including a detection member capable of moving relative to the body in a direction perpendicular to the to-be-wiped surface, the detection member having a first working state and a second working state, where in the first working state, an axial projection of the detection member is located within the to-be-wiped surface, with the detection member abutting against the to-be-wiped surface, and in the second working state, the axial projection of the detection member is at least partially located outside the to-be-wiped surface, with the detection member falling from a frameless edge of the to-be-wiped surface; and a second cleaning assembly, disposed on an outer side of the detection member and capable of moving relative to the body in the direction perpendicular to the to-be-wiped surface to move between a first position and a second position, where the first position is a position where the second cleaning assembly is closest to the to-be-wiped surface;

when the detection device is in the first working state, the second cleaning assembly is in one of the following three working states: a first state maintained at the first position, a second state maintained at the second position, and a third state transitioning between the first position and the second position; and when the detection device is in the second working state, the second cleaning assembly is in one of the following two working states: the first state maintained at the first position, and the second state maintained at the second position.

In some embodiments of the present application, the robotic wiper further includes: a first driving device, disposed on the body and configured to drive the second cleaning assembly to move in the direction perpendicular to the to-be-wiped surface, so that the second cleaning assembly is able to switch between the first position and the second position.

In some embodiments of the present application, the robotic wiper further includes: a control device, where the first driving device is connected to the control device, and the control device is configured to control the first driving device based on an external signal, thereby causing the first driving device to drive the second cleaning assembly to move in the direction perpendicular to the to-be-wiped surface, where the external signal is configured to indicate whether the robotic wiper is moving along an edge of the to-be-wiped surface.

In some embodiments of the present application, both the first driving device and the second cleaning assembly are provided in a quantity of two, where the two first driving devices are respectively connected to the two second cleaning assemblies, and each of the first driving devices is configured to drive the corresponding second cleaning assembly to move.

In some embodiments of the present application, the first driving device is provided in a quantity of one and the second cleaning assembly is provided in a quantity of two, where the one first driving device is connected to the two second cleaning assemblies and configured to drive the two second cleaning assemblies to move.

In some embodiments of the present application, the second cleaning assembly is provided in a quantity of two, where the two second cleaning assemblies are arranged at intervals along a traveling direction of the robotic wiper on one side of the robotic wiper.

In some embodiments of the present application, the robotic wiper has at least a first cleaning mode and a second cleaning mode, where in the first cleaning mode, the robotic wiper traverses the to-be-wiped surface so that the first cleaning assembly cleans the to-be-wiped surface, and the second cleaning assembly remains at the second position.

In some embodiments of the present application, in the second cleaning mode, the robotic wiper moves along the edge of the to-be-wiped surface, one of the two second cleaning assemblies transitions from the second position to the first position and ultimately remains at the first position, while the other remains at the second position.

In some embodiments of the present application, in the first cleaning mode, the detection member is in the first working state; in the second cleaning mode, when the robotic wiper moves along a framed edge of the to-be-wiped surface, the detection member is in the first working state, and when the robotic wiper moves along the frameless edge of the to-be-wiped surface, the detection member is in the second working state.

In some embodiments of the present application, the second cleaning assembly is a cleaning ring, where the cleaning ring is sleeved outside the detection device, and a bottom of the cleaning ring is provided with a first cleaning portion.

In some embodiments of the present application, an outer wall of the cleaning ring is provided with a second cleaning portion.

In some embodiments of the present application, the first cleaning portion includes one of the following: a cleaning brush, a cleaning cloth, or a cleaning scraper.

In some embodiments of the present application, the second cleaning assembly is capable of rotating relative to the detection member.

In some embodiments of the present application, the robotic wiper further includes: a control device, where the detection member includes at least two first detection members, the control device is connected to the at least two first detection members, and when both of the two first detection members switch from the first working state to the second working state, the control device controls the robotic wiper to move along a frameless edge of the to-be-wiped surface; when the robotic wiper moves along the frameless edge of the to-be-wiped surface, the second cleaning assembly is located at the first position, and at least a portion of an axial projection of the second cleaning assembly is located within the to-be-wiped surface.

According to some embodiments of the present application, a robotic wiper is provided, including:

a body;

an adsorption unit, disposed on the body and configured to adsorb the robotic wiper onto a to-be-wiped surface;

a first cleaning assembly, disposed at a bottom of the body and configured to perform a cleaning task on the to-be-wiped surface;

a detection device, disposed at an edge of the body and including a detection member capable of moving relative to the body in a direction perpendicular to the to-be-wiped surface, the detection member having a first working state and a second working state, where in the first working state, an axial projection of the detection member is located within the to-be-wiped surface, with the detection member abutting against the to-be-wiped surface, and in the second working state, the axial projection of the detection member is at least partially located outside the to-be-wiped surface, with the detection member falling from a frameless edge of the to-be-wiped surface and including at least two first detection members arranged at intervals;

a second cleaning assembly, surrounding an outer side of the detection member and capable of moving relative to the body in the direction perpendicular to the to-be-wiped surface to move between a first position and a second position, where the first position is a position where the second cleaning assembly is closest to the to-be-wiped surface; and a control device connected to the at least two first detection members, where when both of the two first detection members switch from the first working state to the second working state, the control device controls the robotic wiper to move along the frameless edge of the to-be-wiped surface, and when the robotic wiper moves along the frameless edge of the to-be-wiped surface, the second cleaning assembly is located at the first position, and at least a portion of an axial projection of the second cleaning assembly is located within the to-be-wiped surface.

In some embodiments of the present application, the detection member further includes a second detection member; in the first cleaning mode, both the first and second detection members are in the first working state; in the second cleaning mode, when the robotic wiper moves along a framed edge of the to-be-wiped surface, both the first and second detection members are in the first working state, and when the robotic wiper moves along the frameless edge of the to-be-wiped surface, the second detection member is in the second working state.

In some embodiments of the present application, the at least two first detection members are arranged at intervals along a direction perpendicular to a traveling direction of the robotic wiper; and when the robotic wiper moves toward the frameless edge of the to-be-wiped surface and both of the two first detection members switch from the first working state to the second working state, the robotic wiper moves away from the frameless edge of the to-be-wiped surface to avoid falling.

In some embodiments of the present application, the detection member further includes a second detection member, where the first detection member and the second detection member are located on adjacent sides of the robotic wiper, respectively; and when the robotic wiper moves along the frameless edge of the to-be-wiped surface, the second detection member is in the second working state.

In some embodiments of the present application, the second detection member is provided in a quantity of two, where when the robotic wiper moves along the frameless edge of the to-be-wiped surface, the two second detection members reciprocate in the direction perpendicular to the to-be-wiped surface.

According to yet another aspect of the present application, a robotic wiper system is provided, including: a base station and the robotic wiper as described above, where the base station is configured to be connected to the robotic wiper via a safety rope.

Since the robotic wiper of some embodiments of the present application includes the first cleaning assembly and the second cleaning assembly, and the second cleaning assembly is disposed on the outer side of the detection member while the detection member is disposed at the edge of the body, when the robotic wiper moves along the edge of the to-be-wiped surface, the second cleaning assembly can contact the edges and corners of the to-be-wiped surface, thereby cleaning the edges and corners of the to-be-wiped surface and improving the cleanliness of these areas of the to-be-wiped surface.

The second cleaning assembly of the robotic wiper of some embodiments of the present application is capable of moving relative to the body in the direction perpendicular to the to-be-wiped surface, so as to move between the first position and the second position. Therefore, when the robotic wiper wipes the interior of the to-be-wiped surface (non-edge and non-corner areas of the to-be-wiped surface), the second cleaning assembly is located at the second position, ensuring that the second cleaning assembly does not contact the interior of the to-be-wiped surface. This prevents the second cleaning assembly from becoming soiled when the robotic wiper wipes the interior of the to-be-wiped surface. When the robotic wiper wipes the edges and corners of the to-be-wiped surface, the second cleaning assembly is located at the first position, allowing the second cleaning assembly to contact and wipe the edges and corners of the to-be-wiped surface. This avoids using the second cleaning assembly that has already wiped the to-be-wiped surface to clean the edges and corners of the to-be-wiped surface, and also prevents the second cleaning assembly that has already wiped the edges and corners of the to-be-wiped surface from wiping the non-edge and non-corner areas of the to-be-wiped surface, thereby avoiding cross-contamination. In this way, simply moving the second cleaning assembly axially can maintain the cleanliness of the second cleaning assembly before cleaning the edges and corners of the to-be-wiped surface, eliminating the need to clean or replace the second cleaning assembly after it has been used for wiping the to-be-wiped surface. This simplifies operation and improves working efficiency.

For the robotic wiper of some embodiments of the present application, when the detection device is in the first working state, the second cleaning assembly is in one of the following three working states: the first state maintained at the first position, the second state maintained at the second position, and the third state transitioning between the first position and the second position; when the detection device is in the second working state, the second cleaning assembly is in one of the following two working states: the first state maintained at the first position, and the second state maintained at the second position. That is, when the detection member is in the first working state of abutting against the to-be-wiped surface, the second cleaning assembly can move in the direction perpendicular to the to-be-wiped surface or remain at the first or second position. At this time, even if accumulated dust on the second cleaning assembly falls between the detection member and the body due to the movement of the second cleaning assembly, the detection member abuts against the to-be-wiped surface, so the residual space between the detection member and the body and the entry point for the accumulated dust to enter the residual space are small. Consequently, less accumulated dust is received between the detection member and the body, resulting in a smaller impact on the sensitivity of the detection member. However, when the axial projection of the detection member is at least partially outside the to-be-wiped surface and in the second working state, the second cleaning assembly cannot move in the direction perpendicular to the to-be-wiped surface and can only remain at the first or second position. This prevents the situation where, when the robotic wiper moves to the edge of the glass, causing the detection member to fall outward from the edge of the to-be-wiped surface and suspend outside the glass surface, the movement of the second cleaning assembly would cause the accumulated dust on the second cleaning assembly to fall into the residual space between the detection member and the body and the entry point for the accumulated dust to enter the residual space. In such a situation, since the residual space and the entry point for the accumulated dust to enter the residual space are larger, more accumulated dust is received between the detection member and the body, resulting in a greater impact on the sensitivity of the detection member. Thus, while ensuring the detection sensitivity of the detection member, the problem of improving the cleanliness of glass edge and corner cleaning is solved, and the need to clean or replace the spherical head that has already wiped the glass is eliminated, simplifying the operation process and improving working efficiency.

The robotic wiper of some embodiments of the present application first detects the frameless edge along the to-be-wiped surface when both of the two first detection members switch from the first working state to the second working state. The control device then controls the robotic wiper to move along the frameless edge of the to-be-wiped surface. When the robotic wiper moves along the frameless edge of the to-be-wiped surface, the second cleaning assembly is located at the first position, and at least a portion of the axial projection of the second cleaning assembly remains within the to-be-wiped surface. This ensures that when the robotic wiper wipes the edge of framed glass, it avoids falling off the glass surface, thereby eliminating the risk of falling. Thus, the robotic wiper of the present application solves the problem of cleaning the edges and corners of frameless glass while ensuring safety.

For the robotic wiper of some embodiments of the present application, after both of the two first detection members switch from the first working state to the second working state, the frameless edge is detected. Simultaneously, both of the two second detection members remain in the second working state, enabling the robotic wiper to move along frameless edge of the to-be-wiped surface. This prevents the risk of falling due to the lack of obstruction at the edge of the to-be-wiped surface.

BRIEF DESCRIPTION OF THE DRAWINGS

With reference to the accompanying drawings, the above and other features of the present application will become apparent. Those skilled in the art will readily understand that these accompanying drawings are for illustrative purposes only rather than for limiting the scope of protection of the present application. Moreover, similar reference signs in the figures denote similar components, where.

Reference signs used in the figures:

10: body; 20: adsorption unit; 30: first cleaning assembly; 40: detection device; 50: second cleaning assembly; 60: second driving device; 101: housing; 102: collision plate; 201: negative pressure chamber; 401: first connection portion; 402: second connection portion; 403: through hole; 404: rod body; 405: first detection member; 406: second detection member; 408: sensing member; 409: protrusion; 70: to-be-wiped surface; and 100: robotic wiper.

DETAILED DESCRIPTION OF THE EMBODIMENTS

It is readily understood that, based on the technical solution of the present application, a person of ordinary skill in the art may propose various mutually replaceable structural configurations and implementation manners without departing from the essential spirit of the present application. Therefore, the following embodiments and the accompanying drawings are merely illustrative of the technical solution of the present application and should not be considered as encompassing the entirety of the present application or as limiting or restricting the technical solution of the present application.

The directional terms such as upper, lower, left, right, front, rear, front side, back side, top, and bottom mentioned or potentially mentioned in this specification are defined relative to the structures shown in the accompanying drawings. They are relative concepts and therefore may change accordingly depending on their different positions and usage states. Thus, these or other directional terms should not be interpreted as limiting terms. Furthermore, the terms such as "first," "second," "third," or similar expressions are used solely for descriptive and distinguishing purposes and should not be construed as indicating or implying relative importance of the corresponding components, or the sequence or assembly order of the components.

Figure 1:
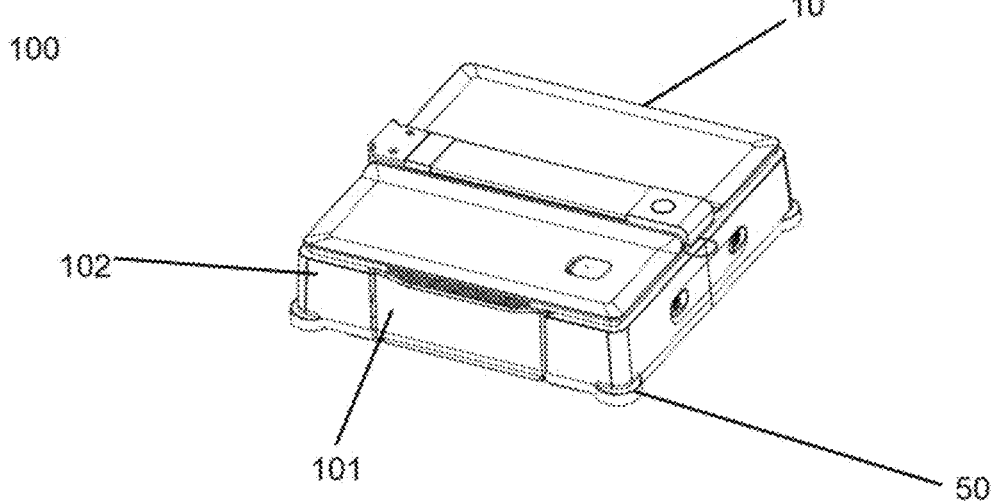
FIG. 1 is a schematic structural diagram of a robotic wiper according to some embodiments of the present application.

Referring to FIG. 1, it shows a schematic structural diagram of a robotic wiper 100 according to some embodiments of the present application. The robotic wiper 100 may be a window-cleaning robot, which can be used to clean surfaces such as glass surfaces, tile surfaces, and wooden surfaces.

Figure 2:
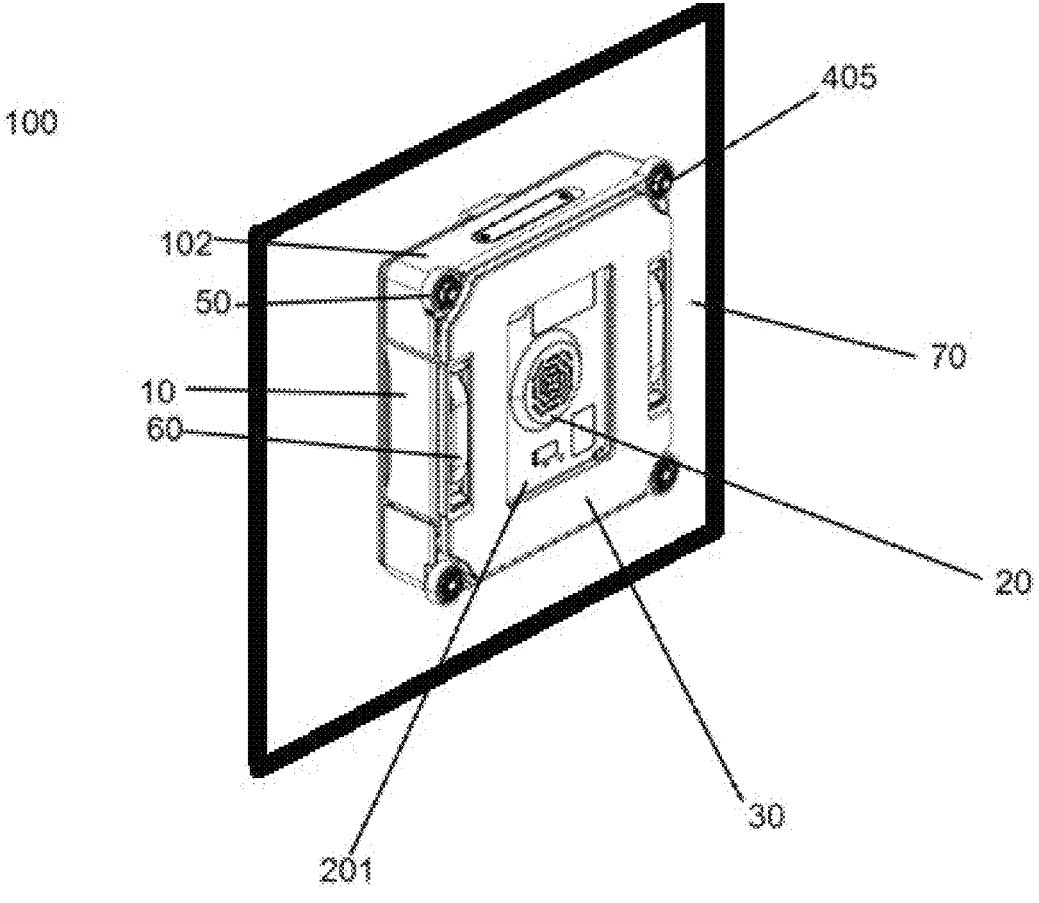
FIG. 2 is a schematic diagram of a first working mode of the robotic wiper according to some embodiments of the present application.
Figure 3:
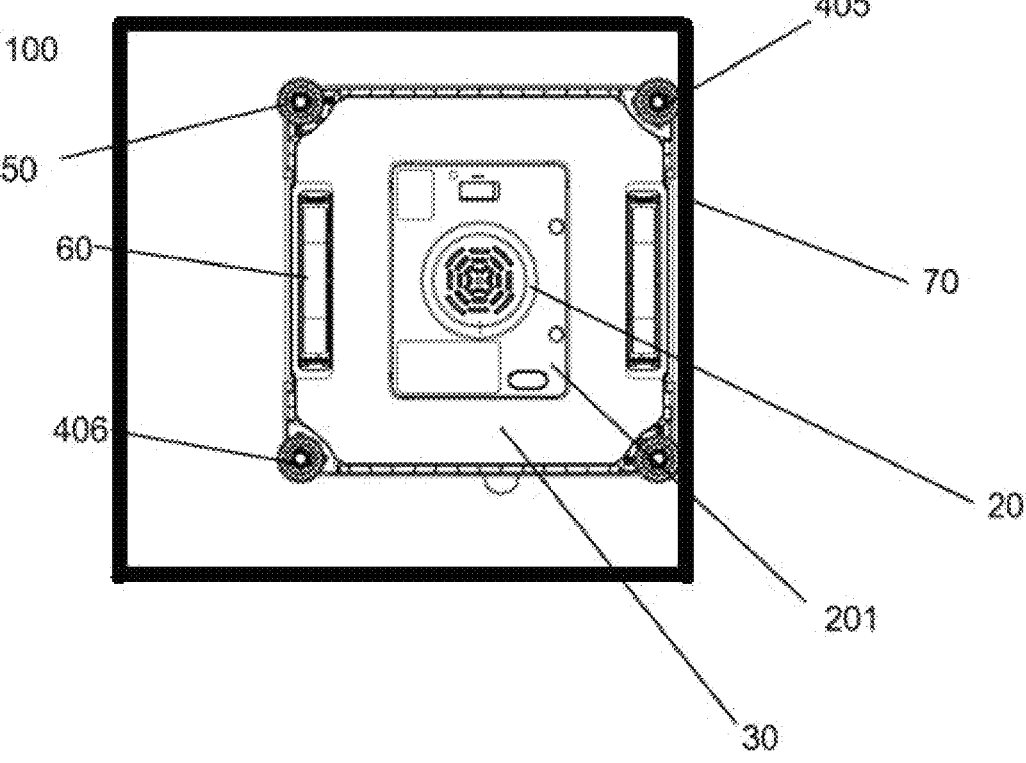
FIG. 3 is a schematic diagram of a second working mode of the robotic wiper according to some embodiments of the present application.
Figure 4:
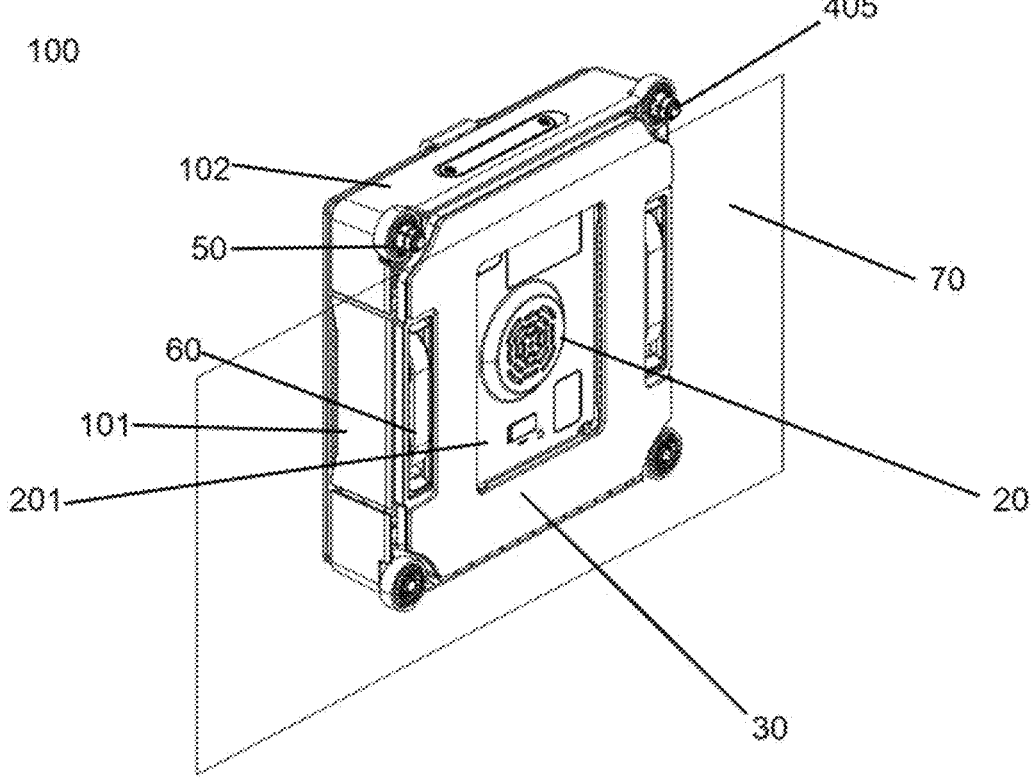
FIG. 4 is a schematic diagram of a detection member of the robotic wiper in a suspended state according to some embodiments of the present application.
Figure 5:
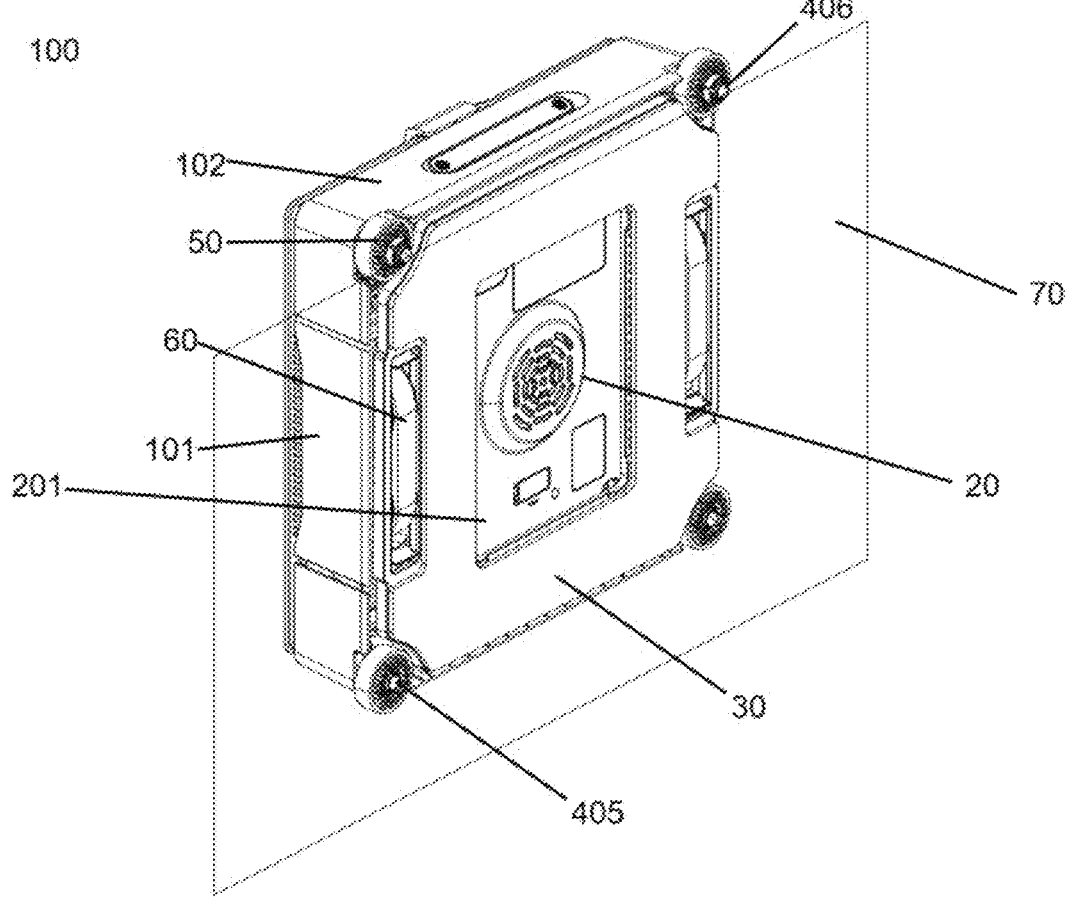
FIG. 5 is a schematic diagram of the robotic wiper working along a frameless edge according to some embodiments of the present application.

Referring to FIGS. 1-5, FIG. 2 is a schematic diagram observed from the inner surface of a framed glass pane when the robotic wiper 100 according to some embodiments of the present application traverses and wipes the outer surface of the glass pane; FIG. 3 is a schematic diagram observed from the inner surface of the framed glass pane when the robotic wiper 100 according to some embodiments of the present application wipes the edge of the outer surface of the glass pane; FIG. 4 is a schematic diagram observed from the inner surface of a frameless glass pane when the robotic wiper 100 according to some embodiments of the present application moves beyond the edge of the outer surface of the glass pane; and FIG. 5 is a schematic diagram observed from the inner surface of the frameless glass pane when the robotic wiper 100 according to some embodiments of the present application moves along the edge of the outer surface of the glass pane. Further, the robotic wiper 100 includes a body 10, an adsorption unit 20, a first cleaning assembly 30, a detection device 40, and a second cleaning assembly 50. The body 10 includes a housing 101 and a collision plate 102. A receiving cavity for accommodating components is formed inside the housing 101. The collision plate 102 surrounds the outer periphery of the housing 101. The collision plate 102 is movably arranged on the housing 101, allowing it to move toward or away from the housing 101. When the collision plate 102 collides with an external obstacle, it moves toward the housing 101. When the collision plate 102 moves away from the external obstacle, it moves away from the housing 101. The external obstacle may be a protrusion on a to-be-wiped surface 70 or a window frame at the edge of the to-be-wiped surface 70. The collision plate 102 can be used to detect various environmental features of the to-be-wiped surface 70, enabling the robotic wiper 100 to perform wiping work based on these environmental features, thereby improving the working efficiency of the robotic wiper 100, reducing failures caused by collisions, and decreasing maintenance frequency and costs. The specific structure of the collision plate 102 and the connection method between the collision plate 102 and the housing 101 may employ relevant technical means from the prior art and thus will not be elaborated herein.

In some embodiments, the robotic wiper 100 can improve the cleanliness of glass edge and corner cleaning while ensuring the detection sensitivity of the spherical head, and avoid cleaning or replacing the spherical head that has already wiped the glass, thereby simplifying the operation process and improving working efficiency.

In some embodiments, the robotic wiper 100 can address the cleaning of frameless glass edges and corners while ensuring safety, and avoid cleaning or replacing the spherical head that has already wiped the glass, thereby simplifying the operation process and improving working efficiency.

Referring to FIG. 1, exemplarily, the body 10 has a generally rectangular shape. Referring to FIGS. 2-5, an adsorption unit 20 is disposed on the body 10. For example, the adsorption unit 20 is disposed at the center of the body 10. The adsorption unit 20 is configured to adsorb the robotic wiper 100 onto the to-be-wiped surface 70. Specifically, the adsorption unit 20 includes a negative pressure chamber 201 disposed at the bottom of the body 10 and a vacuum source disposed within the receiving cavity. The bottom of the housing 101 is recessed inward to form the negative pressure chamber 201. The opening of the negative pressure chamber 201 may face the to-be-wiped surface 70. The vacuum source is in fluid communication with the negative pressure chamber 201. When the vacuum source evacuates the negative pressure chamber 201, a negative pressure environment can be created within the negative pressure chamber 201, thereby adsorbing the body 10 onto the to-be-wiped surface 70. The vacuum source may, for example, be a fan, though it is not limited to a fan and may take other forms, such as a vacuum pump, which is not specified in the present application. A first cleaning assembly 30 is disposed at the bottom of the body 10. For example, the first cleaning assembly 30 is detachably mounted at the bottom of the housing 101. The first cleaning assembly 30 is configured to seal the negative pressure chamber 201 between the to-be-wiped surface 70 and the housing 101. The first cleaning assembly 30 is further configured to clean the to-be-wiped surface 70.

A second driving device 60 is configured to drive the body 10 to move. The second driving device 60 may be a crawler-type structure, though it is not limited thereto and may also be a walking wheel-type structure, which is not specified in the present application. The second driving device 60 may be disposed inside or outside the negative pressure chamber 201.

The detection device 40 may be disposed at the edge of the body 10. For example, the detection device 40 is disposed at a corner or on a side of the body 10. The detection device 40 is configured to detect defects or edges of the to-be-wiped surface 70. Further, referring to FIGS. 6-7, according to some embodiments of the present application, the detection device 40 includes a connection portion connected to the body 10, a moving portion penetrating through the connection portion, and a sensing member 408 mounted on the connection portion. The connection portion may be fixedly connected to the body 10, for example, by screw connection, bolt connection, or integral molding. The connection portion is provided with a through hole 403. Specifically, the connection portion includes a first connection portion 401 and a second connection portion 402 connected to each other. The first connection portion 401 is configured for connection with the body 10. The second connection portion 402 extends downward from the first connection portion 401 and has a cylindrical structure. The second connection portion 402 is provided with the through hole 403.

The moving portion penetrates through the through hole 403. The moving portion can move axially relative to the connection portion within the through hole 403. The moving portion includes a rod body 404 and a detection member disposed at one end of the rod body 404. The detection member may be spherical or hemispherical in shape.

An end of the rod body 404 away from the detection member is provided with a triggering portion. A sensing portion is mounted on the first connection portion 401. The triggering portion is configured to cooperate with the sensing member 408 to identify positional changes of the moving portion, thereby enabling the robotic wiper 100 to determine whether it is located at a defective position or edge of the to-be-wiped surface 70 based on the position of the moving member, and to execute corresponding actions in advance. This prevents the robotic wiper 100 from continuing to move in its original direction and avoids the robotic wiper 100 from falling off the window. Specifically, the triggering portion may be a protrusion 409 disposed on the rod body 404. The sensing portion may be an optocoupler assembly. Certainly, the sensing portion may also be one or a combination of an infrared sensor, an ultrasonic sensor, and a laser sensor. The optocoupler assembly includes a transmitting end and a receiving end arranged opposite each other. The transmitting end is configured to emit an optical signal to the receiving end. When the protrusion 409 is located between the transmitting end and the receiving end, the receiving end cannot receive the optical signal emitted by the transmitting end. When the protrusion 409 is not located between the transmitting end and the receiving end, the receiving end can receive the optical signal emitted by the transmitting end. Thus, when the moving portion moves axially, thereby driving the protrusion 409 to move, the sensing portion can detect the state of the rod body 404. Further, the size of the protrusion 409 on the rod body 404 is larger than the size of the through hole 403. This allows the protrusion 409 to limit the movement of the moving portion, preventing the moving portion from completely disengaging from the through hole 403.

An elastic member is sleeved outside the rod body 404. The elastic member may, for example, be a spring. The elastic member is disposed within the through hole 403 of the second connection portion 402 and is located between the detection member and the triggering portion. When the moving portion moves within the through hole 403, the elastic member outside the rod body 404 can be compressed by the detection member, or the compressed elastic member can extend under its own elastic force, thereby facilitating the movement of the rod body 404.

The detection member is capable of moving relative to the body 10 in a direction perpendicular to the to-be-wiped surface 70. For example, as shown in FIGS. 2-5, the direction perpendicular to the to-be-wiped surface 70 is the direction perpendicular to the plane of the paper. Therefore, in FIGS. 2-5, the detection member is capable of moving relative to the body 10 in the direction perpendicular to the plane of the paper. Further, when the robotic wiper 100 is adsorbed onto the to-be-wiped surface 70 and the moving portion moves axially relative to the connection portion within the through hole 403, the detection member is capable of moving relative to the body 10 in the direction perpendicular to the to-be-wiped surface 70 as the rod body 404 moves. Moreover, the detection member has a first working state and a second working state. In the first working state, as shown in FIGS. 2-3, the axial projection of the detection member is located within the to-be-wiped surface 70, and the detection member abuts against the to-be-wiped surface 70. Specifically, the axial direction of the detection member aligns with the axial direction (extension direction) of the moving portion. When the robotic wiper 100 is adsorbed onto the to-be-wiped surface 70, the axial projection of the detection member is the projection of the detection member in the direction perpendicular to the to-be-wiped surface 70. In this first working state, the moving portion abuts against the to-be-wiped surface, causing the protrusion 409 to be located on a side of the sensing portion away from the detection member. The protrusion 409 on the moving portion is outside the transmitting end and the receiving end, allowing the optical signal emitted by the transmitting end to be received by the receiving end. In this way, the robotic wiper 100 determines that it is not currently at a defective position or edge of the to-be-wiped surface 70 based on the optical signal detected by the receiving end. Furthermore, in this first working state, the elastic member is compressed by the detection member within the through hole 403. In the second working state, as shown in FIGS. 4-5, the axial projection of the detection member is at least partially located outside the to-be-wiped surface 70, and the detection member falls outward from the edge of the to-be-wiped surface. Specifically, in the second working state, at least a portion of the moving portion falls off the to-be-wiped surface, causing the protrusion 409 on the moving portion to be located between the transmitting end and the receiving end. The optical signal emitted by the transmitting end is blocked by the protrusion 409 and cannot be received by the receiving end. Thus, the robotic wiper 100 determines whether the detection member thereof is in a suspended or fallen state based on whether the receiving end can detect the optical signal, indicating that the robotic wiper 100 is at a defective position or edge of the to-be-wiped surface 70. When the detection member transitions from the first working state to the second working state, it changes from abutting against the to-be-wiped surface 70 to detaching from the to-be-wiped surface 70. Specifically, the detection member falls outward from the edge of the to-be-wiped surface 70, causing the protrusion 409 on the moving portion to move from a position outside the transmitting and receiving ends to a position therebetween. The optical signal emitted by the transmitting end changes from being receivable by the receiving end to being blocked by the protrusion 409 and thus unreceivable by the receiving end. Consequently, the robotic wiper 100 determines that the detection member thereof has transitioned from a non-suspended or non-fallen state to a suspended or fallen state based on whether the receiving end can detect the optical signal, until the robotic wiper 100 is at a defective position or edge of the to-be-wiped surface 70. Furthermore, in this second working state, the elastic member extends within the through hole 403.

The detection member includes at least two first detection members 405 arranged at intervals. In an embodiment, the at least two first detection members 405 are arranged at intervals on one side of the robotic wiper 100. For example, as shown in FIG. 4, the at least two first detection members 405 are arranged at intervals on the front side along a direction perpendicular to the traveling direction of the robotic wiper 100. Alternatively, the at least two first detection members 405 are arranged at intervals on the rear side along the direction perpendicular to the traveling direction of the robotic wiper 100. In another embodiment, the at least two first detection members 405 are arranged at intervals on two sides of the robotic wiper 100. For example, the at least two first detection members 405 are arranged at intervals on the left and right sides along the direction perpendicular to the traveling direction of the robotic wiper 100. In another embodiment, the at least two first detection members 405 are arranged along a diagonal of the robotic wiper 100.

As shown in FIG. 4, when both of the two first detection members 405 switch from the first working state to the second working state, it indicates that both of the two first detection members 405 have transitioned from a non-suspended or non-fallen state to a suspended or fallen state. Only when both of the two first detection members 405 fall or become suspended from the frameless edge of the to-be-wiped surface 70 will both of the two first detection members 405 simultaneously switch from the first working state to the second working state. Thus, after both of the two first detection members 405 switch from the first working state to the second working state, it indicates that the robotic wiper 100 has moved to the frameless edge of the to-be-wiped surface 70.

As shown in FIG. 5, the control device controls the robotic wiper 100 to move along the frameless edge of the to-be-wiped surface 70. Specifically, the detection member further includes a second detection member 406, with the first detection member 405 and the second detection member 406 located on adjacent sides of the robotic wiper 100, respectively. For example, when the at least two first detection members 405 are arranged at intervals on the front side along the direction perpendicular to the traveling direction of the robotic wiper 100, the second detection member 406 is located on the left or right side along the direction perpendicular to the traveling direction of the robotic wiper 100. Thus, after both of the two first detection members 405 switch from the first working state to the second working state, the robotic wiper 100 rotates so that the second detection member 406 can switch from the first working state to the second working state, thereby enabling the control device to control the robotic wiper 100 to move forward or backward along the frameless edge of the to-be-wiped surface 70. Further, when the robotic wiper 100 moves along the frameless edge of the to-be-wiped surface 70, the second detection member 406 is in the second working state. Consequently, at least a portion of the second detection member 406 falls off the to-be-wiped surface, allowing the second detection member 406 to detect the frameless edge of the to-be-wiped surface 70. Moreover, the second detection member 406 is provided in a quantity of two. The two second detection members 406 are arranged at intervals along a direction parallel to the traveling direction of the robotic wiper 100. This enables both of the two second detection members 406 to be in the second working state simultaneously, causing at least a portion of both of the two second detection members 406 to fall off the to-be-wiped surface, thereby detecting the frameless edge of the to-be-wiped surface 70 through the two second detection members 406. In an embodiment, both of the two second detection members 406 are disposed at the corners of the body 10. Both of the two first detection members 405 are also disposed at the corners of the body 10. Thus, one of the first detection members 405 and the other second detection member 406 are the same. Certainly, both of the two second detection members 406 may not be disposed at the corners of the body 10. Alternatively, both of the two first detection members 405 may be disposed at the corners of the body 10. In this case, the first detection members 405 and the second detection members 406 are independent of each other. Further, in an embodiment, the detection device 40 includes four first detection members 405 and four second detection members 406, and the four first detection members 405 are also the four second detection members 406. That is, the four first detection members 405 are respectively disposed at the four corners of the body 10.

When the robotic wiper 100 moves along the frameless edge of the to-be-wiped surface 70, the two second detection members 406 reciprocate in the direction perpendicular to the to-be-wiped surface 70, and both of the two second detection members 406 remain in the second working state. Thus, when the robotic wiper 100 moves along the frameless edge of the to-be-wiped surface 70, its direction of movement does not follow a straight line but an approximately straight line. That is, while moving along the frameless edge of the to-be-wiped surface 70, the robotic wiper 100 simultaneously undergoes twisting or oscillating movements at the edge of the to-be-wiped surface 70. This prevents the negative pressure chamber 201 of the adsorption unit from leaking air and causing a falling incident when the robotic wiper 100 moves along the frameless edge of the to-be-wiped surface 70.

The at least two first detection members 405 are arranged at intervals along the direction perpendicular to the traveling direction of the robotic wiper 100; and when the robotic wiper 100 moves toward the frameless edge of the to-be-wiped surface 70 and both of the two first detection members 405 switch from the first working state to the second working state, the robotic wiper 100 moves away from the frameless edge of the to-be-wiped surface 70 to avoid falling.

The second cleaning assembly 50 is disposed on the outer side of the detection device 40. In this embodiment, the second cleaning assembly 50 surrounds the outer side of the second connection portion 402. Specifically, the second cleaning assembly 50 is a cleaning ring. The cleaning ring is sleeved outside the detection device 40, and the bottom of the cleaning ring is provided with a first cleaning portion. More specifically, the cleaning ring is movably sleeved on the outer side of the second connection portion 402. The first cleaning portion includes one of the following: a cleaning brush, a cleaning cloth, or a cleaning scraper. Further, the outer wall of the cleaning ring is provided with a second cleaning portion. The second cleaning portion includes one of the following: a cleaning brush, a cleaning cloth, or a cleaning scraper. The second cleaning portion is configured to clean the window frame of the to-be-wiped surface 70.

The second cleaning assembly 50 is capable of moving relative to the body 10 in the direction perpendicular to the to-be-wiped surface 70, so as to move between a first position and a second position. The first position is a position where the second cleaning assembly 50 is closest to the to-be-wiped surface 70. For example, as shown in FIGS. 2-5, when the robotic wiper 100 is adsorbed onto a vertically positioned to-be-wiped surface 70, the second cleaning assembly 50 is capable of moving relative to the body 10 in a horizontal direction. When the robotic wiper 100 is adsorbed onto a horizontally positioned to-be-wiped surface 70, the second cleaning assembly 50 is capable of moving relative to the body 10 in a vertical direction. For example, as shown in FIG. 5, when the second cleaning assembly 50 is at the first position, the first cleaning portion is capable of contacting the to-be-wiped surface 70, thereby enabling the first cleaning portion to clean the to-be-wiped surface 70. The second position is a position where the second cleaning assembly 50 is farthest from the to-be-wiped surface 70. That is, when the robotic wiper 100 is adsorbed onto the horizontally positioned to-be-wiped surface 70, the first position is the lowest position of the second cleaning assembly 50, and the second position is the highest position of the second cleaning assembly 50.

Further, the robotic wiper 100 has at least a first cleaning mode and a second cleaning mode. As shown in FIG. 2, in the first cleaning mode, the robotic wiper 100 traverses the to-be-wiped surface 70 so that the first cleaning assembly 30 cleans the to-be-wiped surface 70, and the second cleaning assembly 50 remains at the second position. The first cleaning mode may, for example, be a global cleaning mode or a zonal cleaning mode. That is, when the robotic wiper 100 wipes the interior of the to-be-wiped surface 70, the second cleaning assembly 50 is located at the second position, ensuring that the second cleaning assembly 50 does not contact the interior of the to-be-wiped surface 70. This prevents the second cleaning assembly 50 from becoming soiled when the robotic wiper 100 wipes the interior of the to-be-wiped surface 70.

As shown in FIG. 3, in the second cleaning mode, the robotic wiper 100 moves along the edge of the to-be-wiped surface 70 so that the second cleaning assembly 50 can contact the edges and corners of the to-be-wiped surface 70. Thereby, the edges and corners of the to-be-wiped surface 70 are cleaned, improving the cleanliness of these areas of the to-be-wiped surface 70. Thus, when the robotic wiper 100 wipes the edges and corners of the to-be-wiped surface 70, the second cleaning assembly 50 contacts the edges and corners of the to-be-wiped surface 70, so as to wipe the edges and corners of the to-be-wiped surface 70 through the second cleaning assembly 50. This avoids using the second cleaning assembly 50 that has already wiped the to-be-wiped surface 70 to clean the edges and corners of the to-be-wiped surface 70 again. Simply moving the second cleaning assembly 50 axially can maintain its cleanliness before cleaning the edges and corners of the to-be-wiped surface 70, eliminating the need to clean or replace the second cleaning assembly 50 that has already wiped the to-be-wiped surface 70. This simplifies operation and improves working efficiency. The second cleaning mode may, for example, be an edge-following cleaning mode, an edge cleaning mode, or a corner cleaning mode.

The second cleaning assembly 50 may be provided in a quantity of one, two, three, or four. In this embodiment, the second cleaning assembly 50 is provided in a quantity of two. The two second cleaning assemblies 50 are arranged at intervals along the traveling direction of the robotic wiper 100 on one side of the robotic wiper 100. Thus, when the robotic wiper 100 moves along the edge of the to-be-wiped surface 70, one of the second cleaning assemblies 50 can wipe the edge of the to-be-wiped surface 70; or both of the two second cleaning assemblies 50 can wipe the edge of the to-be-wiped surface 70. Moreover, when the robotic wiper 100 moves along the edge of the to-be-wiped surface 70 in two opposite directions, one of the second cleaning assemblies 50 can wipe the edge of the to-be-wiped surface 70 separately. This ensures that the edge of the to-be-wiped surface 70 is cleaned while preventing excessive pressure on the to-be-wiped surface 70 from both of the two second cleaning assemblies 50 simultaneously wiping the to-be-wiped surface 70, which could scratch the to-be-wiped surface 70.

In the second cleaning mode, the robotic wiper 100 moves along the edge of the to-be-wiped surface 70. One of the two second cleaning assemblies 50 transitions from the second position to the first position and ultimately remains at the first position, while the other remains at the second position. That is, when the robotic wiper 100 moves along the edge of the to-be-wiped surface 70, one of the two second cleaning assemblies 50 is used to wipe the edge of the to-be-wiped surface 70, while the other is not used for wiping the edge of the to-be-wiped surface 70. This prevents excessive pressure on the to-be-wiped surface 70 from both of the two second cleaning assemblies 50, thereby avoiding scratching the to-be-wiped surface 70.

The body 10 is further provided with a second driving device 60. The second driving device 60 is configured to drive the second cleaning assembly 50 to move in the direction perpendicular to the to-be-wiped surface 70, enabling the second cleaning assembly 50 to transition between the first position and the second position. This allows automatic adjustment of the position of the second cleaning assembly 50 via the second driving device 60, eliminating the need for manual operation. Moreover, the driving action of the second driving device 60 enables the second cleaning assembly 50 to remain at a specific position (e.g., the first position or the second position), thereby preventing the second cleaning assembly 50 from floating up and down on the to-be-wiped surface 70 when it cannot remain at the specific position, which would reduce cleaning effectiveness. Further, the second driving device 60 may include a drive motor. The rotating shaft of the drive motor is drivingly connected to the cleaning ring, thereby enabling the drive motor to drive the cleaning ring to move between the first position and the second position. Alternatively, the rotating shaft of the drive motor is connected to the cleaning ring via a transmission device, thereby enabling the drive motor to drive the cleaning ring to move between the first position and the second position. The transmission device is configured to convert the rotational motion of the drive motor's rotating shaft into linear motion of the second cleaning assembly 50. The transmission device may, for example, be a rack and pinion mechanism, a cam mechanism, a crank-slider mechanism, or a screw mechanism. Further, when the second cleaning assembly 50 remains at the first position, it can rotate relative to the detection member. That is, while cleaning the to-be-wiped surface 70, the second cleaning assembly 50 can rotate relative to the detection member, thereby improving cleaning efficiency. Specifically, the rotating shaft of the drive motor is connected to the cleaning ring via the transmission device, enabling the drive motor to first drive the cleaning ring to move between the first position and the second position. Then, when the second cleaning assembly 50 remains at the first position, the rotating shaft of the drive motor can drive the second cleaning assembly 50 to rotate.

The control device is connected to the first driving device. The control device is configured to control the first driving device based on an external signal, thereby causing the first driving device to drive the second cleaning assembly 50 to move in the direction perpendicular to the to-be-wiped surface 70, where the external signal is configured to indicate whether the robotic wiper 100 is moving along the edge of the to-be-wiped surface 70. Specifically, when the external signal indicates that the robotic wiper 100 is in the second cleaning mode, the control device is configured to control the first driving device based on the external signal, so that the first driving device drives the second cleaning assembly 50 to move in the direction perpendicular to the to-be-wiped surface 70, thereby locating the second cleaning assembly 50 at the first position. When the external signal indicates that the robotic wiper 100 is in the first cleaning mode, the control device is configured to control the first driving device based on the external signal, so that the first driving device drives the second cleaning assembly 50 to move in the direction perpendicular to the to-be-wiped surface 70, thereby locating the second cleaning assembly 50 at the second position.

Both the first driving device and the second cleaning assembly 50 are provided in a quantity of two, where the two first driving devices are respectively connected to the two second cleaning assemblies 50, and each of the first driving devices is configured to drive the corresponding second cleaning assembly 50 to move. This configuration, with the two first driving devices respectively driving the two second cleaning assemblies 50, prevents interference between the movements of the two second cleaning assemblies 50, thereby avoiding any impact on cleaning effectiveness.

Alternatively, the first driving device is provided in a quantity of one and the second cleaning assembly 50 is provided in a quantity of two, where the one first driving device is connected to the two second cleaning assemblies 50 and configured to drive the two second cleaning assemblies 50 to move. This configuration, with the one first driving device driving both of the two second cleaning assemblies 50, helps reduce costs and decrease the weight of the robotic wiper 100.

In the first cleaning mode, both the first detection member 405 and the second detection member 406 are in the first working state; in the second cleaning mode, when the robotic wiper 100 moves along a framed edge of the to-be-wiped surface 70, both the first detection member 405 and the second detection member 406 are in the first working state, and when the robotic wiper 100 moves along the frameless edge of the to-be-wiped surface 70, the second detection member 406 is in the second working state. That is, in the first cleaning mode, both the first detection member 405 and the second detection member 406 abut against the to-be-wiped surface 70. In the second cleaning mode, since the robotic wiper 100 can detect the framed edge of the to-be-wiped surface 70 based on the collision plate 102, when the robotic wiper 100 moves along the framed edge of the to-be-wiped surface 70, both the first detection member 405 and the second detection member 406 abut against the to-be-wiped surface 70. However, since the robotic wiper 100 cannot detect the frameless edge of the to-be-wiped surface 70 based on the collision plate 102, when the robotic wiper 100 moves along the frameless edge of the to-be-wiped surface 70, the second detection member 406 is in the second working state, thereby enabling the robotic wiper 100 to determine whether it is moving along the framed edge of the to-be-wiped surface 70 based on the second detection member 406.

When the detection member is in the first working state, the second cleaning assembly 50 is in one of the following three working states: a first state maintained at the first position, a second state maintained at the second position, and a third state transitioning between the first position and the second position. As shown in FIG. 2, when the robotic wiper wipes the interior of the to-be-wiped surface 70, the detection member is in the first working state of abutting against the to-be-wiped surface, and the second cleaning assembly is in the second state maintained at the second position. Thus, the second cleaning assembly cannot wipe the interior of the to-be-wiped surface 70. As shown in FIG. 3, when the robotic wiper wipes the edge of the to-be-wiped surface 70, the detection member is in the first working state of abutting against the to-be-wiped surface, and the second cleaning assembly is in the first state maintained at the first position. Thus, the second cleaning assembly can wipe the edge of the to-be-wiped surface 70. As shown in FIGS. 2 and 3, when the robotic wiper transitions from wiping the interior of the to-be-wiped surface 70 to wiping the edge of the to-be-wiped surface 70, the detection member is in the first working state of abutting against the to-be-wiped surface, and the second cleaning assembly is in the third state transitioning between the first position and the second position.

When the detection member is in the second working state, the second cleaning assembly 50 is in one of the following two working states: the first state maintained at the first position, and the second state maintained at the second position. For example, as shown in FIG. 4, when the detection member falls off the edge of the to-be-wiped surface 70, the detection member is in the second working state, and the second cleaning assembly is in the second state maintained at the second position. As shown in FIG. 5, when the robotic wiper wipes the to-be-wiped surface 70 along the edge thereof, the detection member is in the first state maintained at the first position.

Figure 6:
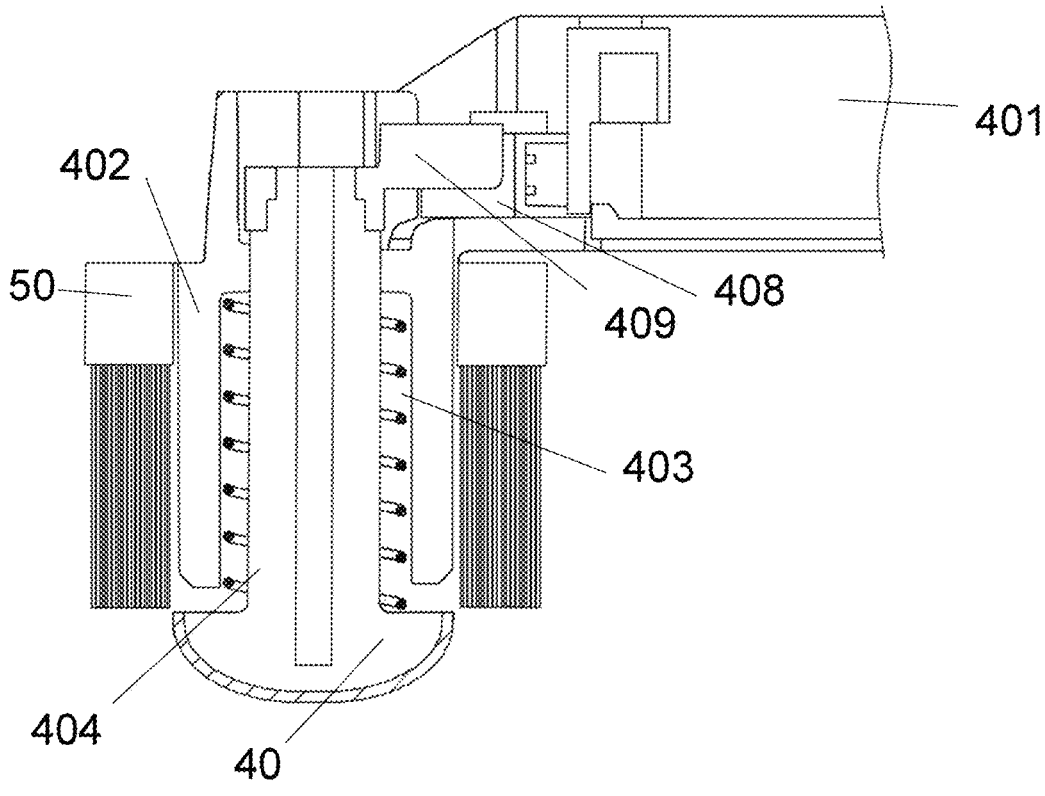
FIG. 6 is a schematic diagram of the detection member of the robotic wiper in a first working state according to some embodiments of the present application.
Figure 7:
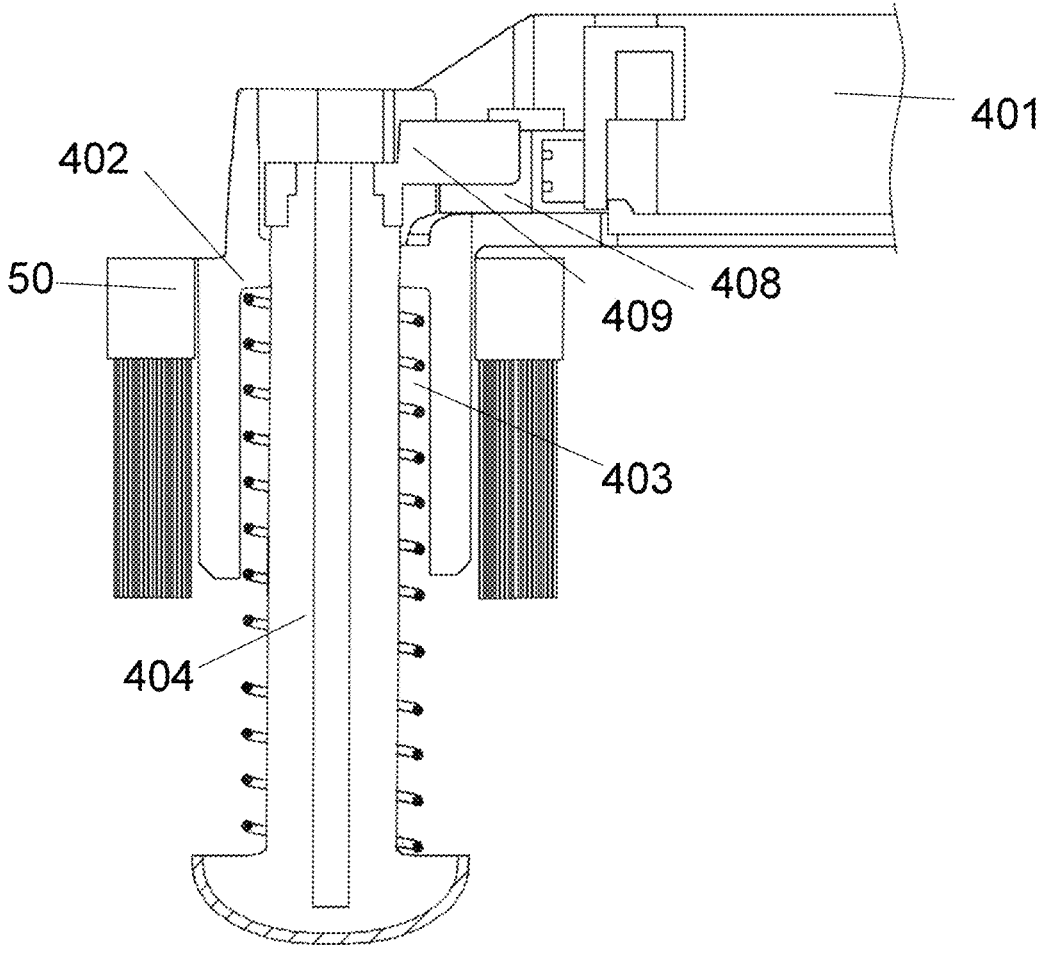
FIG. 7 is a schematic diagram of the detection member of the robotic wiper in a second working state according to some embodiments of the present application.

When the detection member is in the first working state of abutting against the to-be-wiped surface 70, the second cleaning assembly 50 can move in the direction perpendicular to the to-be-wiped surface 70, or remain at the first or second position. For example, as shown in FIG. 6, when the detection member is in the first working state of abutting against the to-be-wiped surface 70, the second cleaning assembly 50 is in the second state maintained at the second position. At this time, even if accumulated dust on the second cleaning assembly falls between the detection member and the body 10 due to the axial movement of the second cleaning assembly 50, the detection member abuts against the to-be-wiped surface 70, so the residual space between the detection member and the body 10 and the entry point for the accumulated dust to enter the residual space are small. Consequently, less accumulated dust is received between the detection member and the body 10, resulting in a smaller impact on the sensitivity of the detection member. However, when the axial projection of the detection member is at least partially outside the to-be-wiped surface 70 and in the second working state, the second cleaning assembly 50 cannot move in the direction perpendicular to the to-be-wiped surface 70 and can only remain at the first or second position. For example, as shown in FIG. 7, when the detection member 40 is suspended above the to-be-wiped surface 70 in the second working state, the second cleaning assembly 50 is in the second state maintained at the second position. If, at this time, the movement of the second cleaning assembly causes the accumulated dust on the second cleaning assembly to fall into the residual space between the detection member and the body 10 and the entry point for the accumulated dust to enter the residual space, the residual space and entry point for the accumulated dust to enter the residual space are larger, leading to more accumulated dust received between the detection member and the body 10 and a greater impact on the sensitivity of the detection member. Therefore, in the present application, when the detection member 40 is in the second working state, the second cleaning assembly 50 cannot move in the direction perpendicular to the to-be-wiped surface 70 and can only remain at the first or second position. Thus, while ensuring the detection sensitivity of the detection member, the problem of improving the cleanliness of glass edge and corner cleaning is solved, and the need to clean or replace the spherical head that has already wiped the glass is eliminated, simplifying the operation process and improving working efficiency.

Another aspect of the present application further provides a robotic wiper 100, including: a body 10; an adsorption unit 20, disposed on the body 10 and configured to adsorb the robotic wiper 100 onto a to-be-wiped surface 70; a first cleaning assembly 30, disposed at a bottom of the body 10 and configured to perform a cleaning task on the to-be-wiped surface; a detection device 40, disposed at an edge of the body 10 and including a detection member capable of moving relative to the body 10 in a direction perpendicular to the to-be-wiped surface 70, the detection member having a first working state and a second working state, where in the first working state, an axial projection of the detection member is located within the to-be-wiped surface 70, with the detection member abutting against the to-be-wiped surface 70, and in the second working state, the axial projection of the detection member is at least partially located outside the to-be-wiped surface 70, with the detection member falling outward from a frameless edge of the to-be-wiped surface and including at least two first detection members 405 arranged at intervals; a second cleaning assembly 50, surrounding an outer side of the detection member and capable of moving relative to the body 10 in the direction perpendicular to the to-be-wiped surface 70 to move between a first position and a second position, where the first position is a position where the second cleaning assembly 50 is closest to the to-be-wiped surface 70; and a control device connected to the at least two first detection members 405, where when both of the first detection members 405 switch from the first working state to the second working state, the control device controls the robotic wiper 100 to move along the frameless edge of the to-be-wiped surface 70, and when the robotic wiper 100 moves along the frameless edge of the to-be-wiped surface 70, the second cleaning assembly 50 is located at the first position, and at least a portion of an axial projection of the second cleaning assembly 50 is located within the to-be-wiped surface 70.

The robotic wiper 100 of the present application first detects the frameless edge along the to-be-wiped surface 70 when both of the two first detection members 405 switch from the first working state to the second working state. The control device then controls the robotic wiper 100 to move along the frameless edge of the to-be-wiped surface 70. When the robotic wiper 100 moves along the frameless edge of the to-be-wiped surface 70, the second cleaning assembly 50 is located at the first position, and at least a portion of the axial projection of the second cleaning assembly 50 remains within the to-be-wiped surface 70. This ensures that when the robotic wiper 100 wipes the edge of framed glass, it avoids falling off the glass surface, thereby eliminating the risk of falling. Thus, the robotic wiper 100 of the present application solves the problem of cleaning the edges and corners of frameless glass while ensuring safety.

Another aspect of the present application further provides a robotic wiper 100, including: a body 10; an adsorption unit 20, disposed on the body 10 and configured to adsorb the robotic wiper 100 onto a to-be-wiped surface 70; a detection device 40, disposed at an edge of the body 10 and including a detection member capable of moving relative to the body 10 in a direction perpendicular to the to-be-wiped surface 70, the detection member having a first working state and a second working state, where in the first working state, an axial projection of the detection member is located within the to-be-wiped surface 70, with the detection member abutting against the to-be-wiped surface 70, and in the second working state, the axial projection of the detection member is at least partially located outside the to-be-wiped surface 70, with the detection member falling outward from a frameless edge of the to-be-wiped surface and including at least two first detection members 405 arranged at intervals; and a control device connected to the at least two first detection members 405, where when both of the first detection members 405 switch from the first working state to the second working state, the control device controls the robotic wiper 100 to move along the frameless edge of the to-be-wiped surface 70.

The robotic wiper 100 of the present application first detects the frameless edge along the to-be-wiped surface 70 when both of the two first detection members 405 switch from the first working state to the second working state. The control device then controls the robotic wiper 100 to move along the frameless edge of the to-be-wiped surface 70. When the robotic wiper 100 moves along the frameless edge of the to-be-wiped surface 70, the second cleaning assembly 50 is located at the first position, and at least a portion of the axial projection of the second cleaning assembly 50 remains within the to-be-wiped surface 70. This ensures that when the robotic wiper wipes the edge of framed glass, it avoids falling off the glass surface, thereby eliminating the risk of falling. Thus, the robotic wiper 100 of the present application solves the problem of cleaning the edges and corners of frameless glass while ensuring safety.

Another aspect of the present application further provides a robotic wiper 100, including: a body 10; an adsorption unit 20, disposed on the body 10 and configured to adsorb the robotic wiper 100 onto a to-be-wiped surface 70; a first cleaning assembly 30, disposed at a bottom of the body 10 and configured to perform a cleaning task on the to-be-wiped surface 70; and a second cleaning assembly 50, disposed on an outer edge of the body 10 and capable of moving relative to the body 10 in the direction perpendicular to the to-be-wiped surface 70 to move between a first position and a second position, where the first position is a position where the second cleaning assembly 50 is closest to the to-be-wiped surface 70.

Since the robotic wiper 100 of the present application includes the first cleaning assembly 30 and the second cleaning assembly 50, and the second cleaning assembly 50 is disposed on the outer side of the detection member while the detection member is disposed at the edge of the body 10, when the robotic wiper 100 moves along the edge of the to-be-wiped surface 70, the second cleaning assembly 50 can contact the edges and corners of the to-be-wiped surface 70, thereby cleaning the edges and corners of the to-be-wiped surface 70 and improving the cleanliness of these areas of the to-be-wiped surface 70.

Another aspect of the present application further provides a robotic wiper 100, including: a body 10; an adsorption unit 20, disposed on the body 10 and configured to adsorb the robotic wiper 100 onto a to-be-wiped surface 70; a first cleaning assembly 30, disposed at a bottom of the body 10 and configured to perform a cleaning task on the to-be-wiped surface 70; a detection device 40, disposed at an edge of the body 10 and including a detection member capable of moving in a direction perpendicular to the to-be-wiped surface 70, the detection member having a first working state of abutting against the to-be-wiped surface 70 and a second working state of falling outward from a frameless edge of the to-be-wiped surface; and a second cleaning assembly 50, surrounding an outer side of the detection device 40 and capable of moving relative to the body 10 in the direction perpendicular to the to-be-wiped surface 70 to move between a first position and a second position, where the first position is a position where the second cleaning assembly 50 is closest to the to-be-wiped surface 70. The robotic wiper 100 has at least a first cleaning mode and a second cleaning mode, where in the first cleaning mode, the robotic wiper 100 traverses the to-be-wiped surface 70 so that the first cleaning assembly 30 cleans the to-be-wiped surface 70, and the second cleaning assembly 50 remains at the second working position; in the second cleaning mode, the second cleaning assembly 50 remains at the first working position, and the robotic wiper 100 moves along the edge of the to-be-wiped surface 70 so that the second cleaning assembly 50 can clean the edge of the to-be-wiped surface 70.

When the second cleaning assembly 50 of the robotic wiper 100 of the present application is in the first cleaning mode, the robotic wiper 100 traverses the to-be-wiped surface 70 so that the first cleaning assembly 30 cleans the to-be-wiped surface 70, and the second cleaning assembly 50 remains at the second working position; in the second cleaning mode, the second cleaning assembly 50 remains at the first working position, and the robotic wiper 100 moves along the edge of the to-be-wiped surface 70 so that the second cleaning assembly 50 can clean the edge of the to-be-wiped surface 70. Thus, when the robotic wiper 100 wipes the interior of the to-be-wiped surface 70, the second cleaning assembly 50 is located at the second position, ensuring that the second cleaning assembly 50 does not contact the interior of the to-be-wiped surface 70. This prevents the second cleaning assembly 50 from becoming soiled when the robotic wiper 100 wipes the interior of the to-be-wiped surface 70. When the robotic wiper 100 wipes the edges and corners of the to-be-wiped surface 70, the second cleaning assembly 50 is located at the first position, allowing the second cleaning assembly 50 to contact and wipe the edges and corners of the to-be-wiped surface 70. This avoids using the second cleaning assembly 50 that has already wiped the to-be-wiped surface 70 to clean the edges and corners of the to-be-wiped surface 70 again. Simply moving the second cleaning assembly 50 axially can maintain its cleanliness before cleaning the edges and corners of the to-be-wiped surface 70, eliminating the need to clean or replace the second cleaning assembly 50 that has already wiped the to-be-wiped surface 70. This simplifies operation and improves working efficiency.

A third aspect of the present application further provides a robotic wiper 100 system, including: the robotic wiper 100 as described above and a base station, where the base station is configured to be connected to the robotic wiper 100 via a safety rope.

The robotic wiper 100 system possesses all the technical effects of the aforementioned robotic wiper 100, which will not be elaborated herein.

It should be understood that all the above preferred embodiments are exemplary and not restrictive. Various modifications or variations made by those skilled in the art to the embodiments described above under the concept of the present application shall fall within the legal protection scope of the present application.

What is claimed is:

1. A robotic wiper, comprising:
   a body;
   an adsorption unit, disposed on the body and configured to adsorb the robotic wiper onto a to-be-wiped surface;
   a first cleaning assembly, disposed at a bottom of the body and configured to perform a cleaning task on the to-be-wiped surface;
   a detection device, disposed at an edge of the body and comprising a detection member capable of moving relative to the body in a direction perpendicular to the to-be-wiped surface, the detection member having a first working state and a second working state, wherein in the first working state, an axial projection of the detection member is located within the to-be-wiped surface, with the detection member abutting against the to-be-wiped surface, and in the second working state, the axial projection of the detection member is at least partially located outside the to-be-wiped surface, with the detection member falling from an edge of the to-be-wiped surface; and
   a second cleaning assembly, disposed on an outer side of the detection device and capable of moving relative to the body in the direction perpendicular to the to-be-wiped surface to move between a first position and a second position, wherein the first position is a position where the second cleaning assembly is closest to the to-be-wiped surface;
   when the detection member is in the first working state, the second cleaning assembly is in one of the following three working states: a first state maintained at the first position, a second state maintained at the second position, and a third state transitioning between the first position and the second position; and
   when the detection member is in the second working state, the second cleaning assembly is in one of the following two working states: the first state maintained at the first position, and the second state maintained at the second position.

2. The robotic wiper of claim 1, further comprising: a first driving device, disposed on the body and configured to drive the second cleaning assembly to move in the direction perpendicular to the to-be-wiped surface, so that the second cleaning assembly is able to switch between the first position and the second position.

3. The robotic wiper of claim 2, further comprising: a control device, wherein the first driving device is connected to the control device, and the control device is configured to control the first driving device based on an external signal, thereby causing the first driving device to drive the second cleaning assembly to move in the direction perpendicular to the to-be-wiped surface, wherein the external signal is configured to indicate whether the robotic wiper is moving along the edge of the to-be-wiped surface.

4. The robotic wiper of claim 2, wherein both the first driving device and the second cleaning assembly are provided in a quantity of two, wherein the two first driving devices are respectively connected to the two second cleaning assemblies, and each of the first driving devices is configured to drive the corresponding second cleaning assembly to move.

5. The robotic wiper of claim 2, wherein the first driving device is provided in a quantity of one and the second cleaning assembly is provided in a quantity of two, wherein the one first driving device is connected to the two second cleaning assemblies and configured to drive the two second cleaning assemblies to move.

6. The robotic wiper of claim 2, wherein the second cleaning assembly is provided in a quantity of two, wherein the two second cleaning assemblies are arranged at intervals along a traveling direction of the robotic wiper on one side of the robotic wiper.

7. The robotic wiper of claim 1, wherein the robotic wiper has at least a first cleaning mode and a second cleaning mode, wherein in the first cleaning mode, the robotic wiper traverses the to-be-wiped surface so that the first cleaning assembly cleans the to-be-wiped surface, and the second cleaning assembly remains at the second position.

8. The robotic wiper of claim 7, wherein in the second cleaning mode, the robotic wiper moves along the edge of the to-be-wiped surface, one of the two second cleaning assemblies transitions from the second position to the first position and ultimately remains at the first position, while the other remains at the second position.

9. The robotic wiper of claim 7, wherein in the first cleaning mode, the detection member is in the first working state; in the second cleaning mode, when the robotic wiper moves along a framed edge of the to-be-wiped surface, the detection member is in the first working state, and when the robotic wiper moves along a frameless edge of the to-be-wiped surface, the detection member is in the second working state.

10. The robotic wiper of claim 1, wherein the second cleaning assembly is a cleaning ring, wherein the cleaning ring is sleeved outside the detection device, and a bottom of the cleaning ring is provided with a first cleaning portion.

11. The robotic wiper of claim 10, wherein an outer wall of the cleaning ring is provided with a second cleaning portion.

12. The robotic wiper of claim 10, wherein the first cleaning portion comprises one of the following: a cleaning brush, a cleaning cloth, or a cleaning scraper.

13. The robotic wiper of claim 1, wherein the second cleaning assembly is capable of rotating relative to the detection member.

14. The robotic wiper of claim 1, wherein the robotic wiper further comprises: a control device, wherein the detection member comprises at least two first detection members, the control device is connected to the at least two first detection members, and when both of the two first detection members switch from the first working state to the second working state, the control device controls the robotic wiper to move along a frameless edge of the to-be-wiped surface; when the robotic wiper moves along the frameless edge of the to-be-wiped surface, the second cleaning assembly is located at the first position, and at least a portion of an axial projection of the second cleaning assembly is located within the to-be-wiped surface.

15. A robotic wiper, comprising:
   a body;
   an adsorption unit, disposed on the body and configured to adsorb the robotic wiper onto a to-be-wiped surface;
   a first cleaning assembly, disposed at a bottom of the body and configured to perform a cleaning task on the to-be-wiped surface;
   a detection device, disposed at an edge of the body and comprising a detection member capable of moving relative to the body in a direction perpendicular to the to-be-wiped surface, the detection member having a first working state and a second working state, wherein in the first working state, an axial projection of the detection member is located within the to-be-wiped surface, with the detection member abutting against the to-be-wiped surface, and in the second working state, the axial projection of the detection member is at least partially located outside the to-be-wiped surface, with the detection member falling from a frameless edge of the to-be-wiped surface and comprising at least two first detection members arranged at intervals;
   a second cleaning assembly, surrounding an outer side of the detection member and capable of moving relative to the body in the direction perpendicular to the to-be-wiped surface to move between a first position and a second position, wherein the first position is a position where the second cleaning assembly is closest to the to-be-wiped surface; and
   a control device connected to the at least two first detection members, wherein when both of the first detection members switch from the first working state to the second working state, the control device controls the robotic wiper to move along the frameless edge of the to-be-wiped surface, and when the robotic wiper moves along the frameless edge of the to-be-wiped surface, the second cleaning assembly is located at the first position, and at least a portion of an axial projection of the second cleaning assembly is located within the to-be-wiped surface.

16. The robotic wiper of claim 15, wherein the detection member further comprises a second detection member; in the first cleaning mode, both the first and second detection members are in the first working state; in the second cleaning mode, when the robotic wiper moves along a framed edge of the to-be-wiped surface, both the first and second detection members are in the first working state, and when the robotic wiper moves along the frameless edge of the to-be-wiped surface, the second detection member is in the second working state.

17. The robotic wiper of claim 15, wherein the at least two first detection members are arranged at intervals along a direction perpendicular to a traveling direction of the robotic wiper; and when the robotic wiper moves toward the frameless edge of the to-be-wiped surface and both of the two first detection members switch from the first working state to the second working state, the robotic wiper moves away from the frameless edge of the to-be-wiped surface to avoid falling.

18. The robotic wiper of claim 15, wherein the detection member further comprises a second detection member, wherein the first detection member and the second detection member are located on adjacent sides of the robotic wiper, respectively; and when the robotic wiper moves along the frameless edge of the to-be-wiped surface, the second detection member is in the second working state.

19. The robotic wiper of claim 18, wherein the second detection member is provided in a quantity of two, wherein when the robotic wiper moves along the frameless edge of the to-be-wiped surface, the two second detection members reciprocate in the direction perpendicular to the to-be-wiped surface.

20. A robotic wiper system, comprising: the robotic wiper of claim 1 and a base station, wherein the base station is configured to be connected to the robotic wiper via a safety rope.

*    *    *    *    *